No. 816,804. PATENTED APR. 3, 1906.
A. MAGNUSON.
SYSTEM OF MOTOR CONTROL.
APPLICATION FILED JAN. 18, 1905.
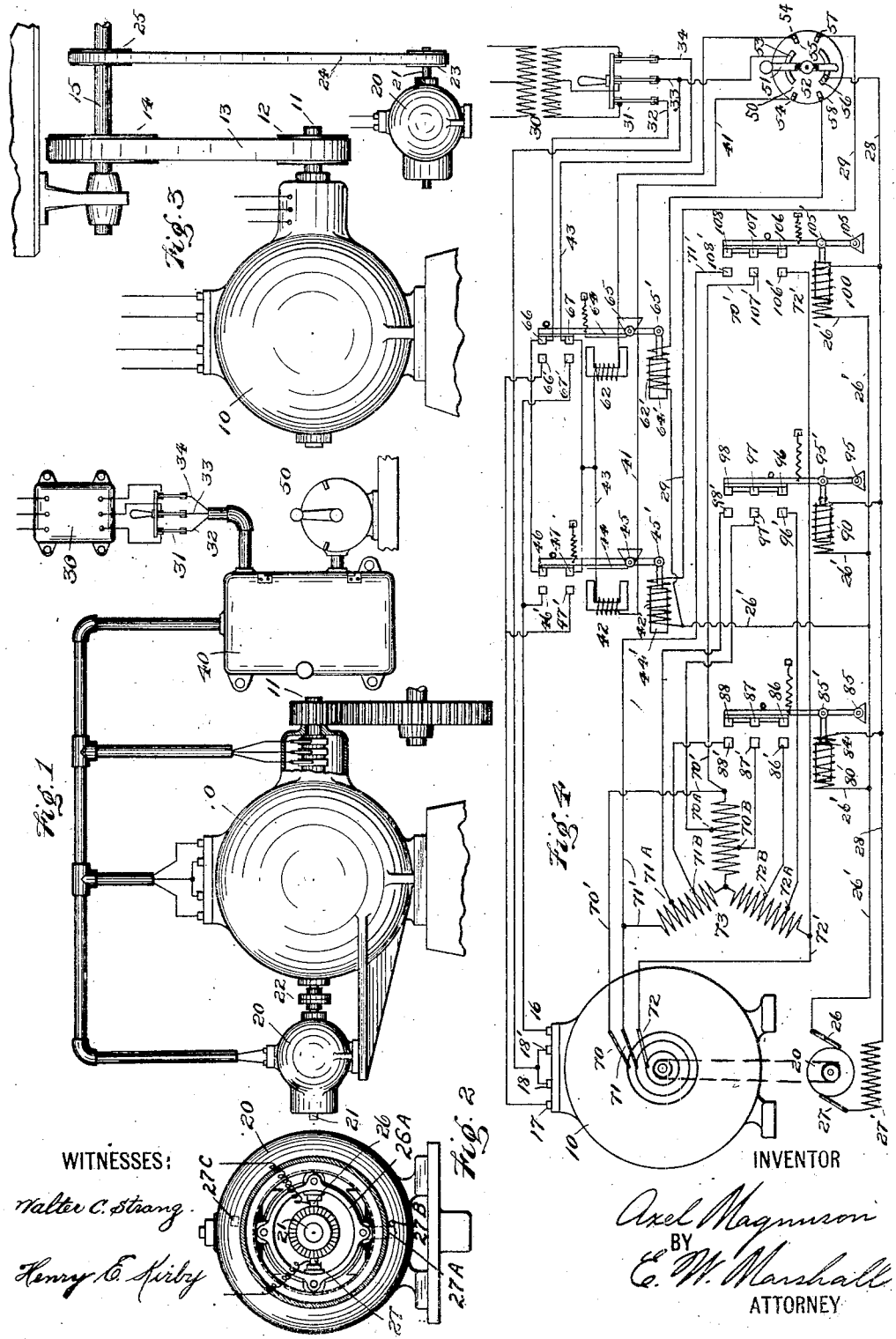
WITNESSES:
Walter C. Strang
Henry E. Kirby
INVENTOR
Axel Magnuson
BY
E. W. Marshall
ATTORNEY

UNITED STATES PATENT OFFICE.

AXEL MAGNUSON, OF NEW YORK, N. Y., ASSIGNOR, BY MESNE ASSIGNMENTS, TO OTIS ELEVATOR COMPANY, OF JERSEY CITY, NEW JERSEY, A CORPORATION OF NEW JERSEY.

SYSTEM OF MOTOR CONTROL.

No. 816,804.  Specification of Letters Patent.  Patented April 3, 1906.

Application filed January 18, 1905. Serial No. 241,592.

*To all whom it may concern:*

Be it known that I, AXEL MAGNUSON, a citizen of the United States, and a resident of New York city, in the county of New York and State of New York, have invented certain new and useful Improvements in Systems of Motor Control, of which the following is a specification.

My invention relates to a system of motor control; and it consists of a novel arrangement of various apparatus and circuits whereby an electric motor may be started, stopped, or reversed at will.

Although my system is applicable to other types of electric motors, it may be used to great advantage in conjunction with alternating-current motors.

Referring to the drawings, Figure 1 is a side elevation of an electric motor with certain connected parts and with the various parts of the apparatus which I use in carrying out my invention shown in connection therewith. Fig. 2 is an end view of a generator which I use and shows certain details of construction which will be described later. Fig. 3 is an elevation showing a motor connected to run a shaft and with a generator connected to the driven shaft. Fig. 4 is a diagram of a preferred form of electrical circuits and certain apparatus which illustrates the use of my invention.

Like characters of reference designate corresponding parts in all of the figures.

10 designates a motor which is to be controlled. In the drawings it is shown as an alternating-current motor.

20 is a direct-current generator which is driven by the motor 10. It may be directly connected to the motor by having its shaft 21 connected to the motor-shaft 11 by a coupling 22, as shown in Fig. 1, or it may be connected to a moving part of some mechanism which is driven by the motor 10. Such an arrangement is shown in Fig. 3, in which the motor is connected to drive a shaft 15 by means of a belt 13, running over a pulley 12 on the motor-shaft 11 and another pulley 14 on the driven shaft 15. In this case the generator is arranged to be driven from the shaft 15 by means of a belt 24 and pulleys 23 and 25.

30 designates a transformer the primary of which is connected to a suitable source of electrical supply. Its secondary is connected, through a switch 31, to an electric controller 40, which contains certain magnets, switches, and other apparatus, all of which will be pointed out later.

50 is a manually-operated circuit closer or switch which may be situated in any convenient place and by means of which the motor may be started, stopped, or reversed at will. This manually-operated switch 50 comprises a movable contact-arm 51, pivoted at 52 and divided into two parts. The upper part is arranged to make an electrical connection between a segmental contact-piece 53, which is connected to one of the leads 33 from the transformer 30 and either the stationary contact 54 or the stationary contact 55. At the same time the lower part of the movable contact-arm 51 will make connection between a segmental contact-piece and either the stationary contact 57 or the stationary contact 58.

Let us, for example, consider that the top of the movable contact 51 has been moved to the left. Stationary contact 54 will then be connected with one of the mains 33. A circuit will then be established from these through wire 41 to the lower terminal of a magnet 42, thence through conductor 43 to the main 34. Thus the magnet 42 will be connected in one phase of the line and become energized and attract its armature 44. The latter is pivoted at 45. When it is moved by the magnet 42, it will move the contacts 46 and 47 against the contacts 46' and 47', respectively. This will close circuits from the main 32 to the terminal 16 on the motor and from the main 34 to the terminal 17 on the motor, and as the terminals 18 18' are already connected to the main 33 it will be seen that the motor is now connected to the three mains, and, with the other circuits connected as shown, the motor will begin to rotate.

As the generator 20 is connected to run with the motor, it will now begin to rotate and to generate an electromotive force. A conductor 26' is led from one of the brushes 26 of the generator to a number of magnets 42' is one of these magnets, and one of its terminals is connected to this conductor 26 Its other terminal is connected by a conduc tor 29 to the stationary contact 57. This contact is now connected by movable contact 51 to the segmental contact 56, and this is connected by conductor 28, through the series field 27' of the generator, to the other brush 27. The magnet 42' then is directly connected to the generator and will receive current from it as the generator revolves. The magnet 42' then will be energized and will pull its core 44' to the right, and as it is connected at 45' to the arm which carries the armature 44 it will assist the magnet 42. As the current in magnet 42' is a direct current, it will hold the contacts 46 47 against the contacts 46' 47' firmly without the chattering which would be caused by the alternating current in the magnet 42.

If the movable lever 51 had been moved to the right, the operation would be similar to that above described, except that in this case the magnet 62 would be energized and the contacts 66 67 would be closed against the contacts 66' and 67'. This will connect main 32 to motor-terminal 17 and main 34 to motor-terminal 16 and will cause the motor to rotate in the opposite direction.

It will be seen that an opposition element is interposed in the rotor-circuit of the motor in the form of the star-connected resistance 73. This opposition element may be resistance or inductance or any other desired arrangement which may be used to prevent too great a flow of current. When the motor is started, all of this resistance is preferably inserted in the rotor-circuit. The motor will not then get full power at once, but will begin to rotate slowly. The resistance should then be cut out of the circuit gradually in order to give the motor the proper acceleration. I will now describe my improved method of accomplishing this result.

By examining the diagram it may be seen that the leads from the generator are connected to three magnets 80, 90, and 100. The lead 26' is connected to the left-hand end of each of these magnets, and the lead 28 is connected to the right-hand side of each of these magnets. I will now describe the magnet 80, with its various connected parts. This comprises a coil to which the leads just referred to are connected, and a core 84. This core is mechanically connected at 85' to a vertical arm, which is pivoted to a stationary point at 85. The upper part of this arm carries three contacts 86, 87, and 88, which are electrically connected together. When the magnet 80 is energized, it will pull the vertical arm which carries these contacts over to the left until they connect with three stationary contacts 86', 87', and 88'. These three stationary contacts are electrically connected to the points $72^B$, $70^B$, and $71^B$ on the starting resistance. It is evident, then, that when the magnet 80 has connected the contacts 86 87 88 with the contacts 86' 87' 88' the inner part of this starting resistance will be short-circuited thereby. In a similar manner the magnet 90 is arranged to draw contacts 96 97 98 against contacts 96' 97' 98' and to electrically connect them and to thereby short-circuit another section of the starting resistance, as they are connected to the points $72^A$, $70^A$, and $71^A$, respectively. The magnet 100 is similarly arranged to short-circuit the third and last section of this starting resistance by drawing contacts 106, 107, and 108 against contacts 106', 107', and 108'. These magnets then are for the purpose of short-circuiting the starting resistance in a number of steps. They are preferably arranged or adjusted to be drawn in one by one as the potential of the generator 20 increases. This adjustment may be made in any of the well-known ways—as, for example, by means of springs or weights or by setting the cores of the magnets at different distances within the windings of the magnets. As the generator 20 is connected to run with the motor 10, its voltage will increase in direct proportion to the increase of speed of the motor, and as these magnets are adjusted, as just pointed out, to operate one at a time as the voltage increases it is evident that the starting resistance will be cut out by these magnets in direct proportion to the speed of the motor, and the acceleration of the motor of course depends upon the load which it has to drive. The generator 20 may be of any desired form—as, for example, a dynamo with permanently-excited fields—or it may be excited by a shunt-field or a series field 27', as shown in the diagram. It is desirable in most cases to have the direction of current flowing from this generator a constant one, and I have shown in Fig. 2 one method of accomplishing this result. The armature-brushes 26 and 27 are mounted upon the yoke $26^A$, which is provided with antifriction-rollers. This yoke is arranged to travel through a semicircle as the motor rotates in one direction or the other. An arm $27^A$ is connected to this yoke and is adapted to come in contact with pins or stops $27^B$ and $27^C$ when the brushes are at the proper point on the commutator of the motor. If the motor-armature is rotating in such a direction as to be anticlockwise when looked at from the view shown in Fig. 2, the arm $27^A$ will be brought against the stop $27^B$ and the brushes 26 and 27 will be held in the position shown in the drawings. If the motor-armature rotates in the opposite direction, the arm $27^A$ will be carried around until it comes into engagement with the stop $27^B$, when the position of the brushes 26 and 27 will be interchanged.

This invention is applicable to any form of electric motor and to many forms of starting devices which may be operated by a variable voltage. The various forms of switches and circuits which I have shown are merely shown to illustrate my invention, and I do not wish to limit myself to any particular form. While in the drawings I have shown a resistance in the rotor-circuit of an alternating-current motor, I do not wish to confine myself to the use of a resistance, as many other devices may be used for the purpose of starting the motor. In some cases, even, it is desirable to admit more current to the motor in starting than is admitted to it while running, and this invention is applicable to such an arrangement. While the drawings show the motor as connected to a multiphase supply-circuit, the actuating-magnets of the reversing-switches are connected in a single phase only, and it is evident that the controlling-circuits here shown are applicable to any alternating-current system.

What I claim is—

1. The combination with an electric motor, of controlling apparatus therefor, means for controlling single-phase current to operate said motor-controlling apparatus, and an electric device for holding said motor-controlling apparatus in a predetermined position.

2. The combination with a multiphase motor, of controlling apparatus therefor, means in a circuit connected across any two of the mains of said motor, for closing a single-phase circuit to said motor-controlling apparatus, and electric holding means for said controlling apparatus.

3. The combination with an electric motor, of controlling apparatus therefor, holding means for said controlling apparatus, a source of single-phase current, a source of direct current, and a single switch device for controlling the single-phase current to operate said motor-controlling apparatus and for controlling the direct current to operate said holding means.

4. The combination with an electric motor, of starting-switches therefor, electroresponsive devices for closing said switches, electromagnetic apparatus for holding said switches in closed position, a source of single-phase current, a source of direct current and a single manual switch for controlling the single-phase current to operate said electroresponsive devices and for controlling the direct current to operate said electromagnetic holding apparatus.

5. The combination with an alternating-current motor, of reversing-switches therefor, single-phase magnets for actuating said switches to closed position, direct-current magnets for holding said switches in closed position, and means for controlling both the said single-phase magnets and the said direct-current magnets.

6. The combination with an alternating-current motor, of two reversing-switches therefor, an electroresponsive device for each of said switches to actuate the same to closed position, an electromagnet connected to each switch to hold the same in closed position, and a manual switch for controlling single-phase current to operate either of the electroresponsive devices and for controlling direct current to operate the corresponding holding-electromagnet.

7. In combination with a motor, a source of electrical supply, a resistance in series with the motor-armature, and a generator connected to the motor and arranged to control said resistance in starting the motor.

8. In combination with a motor, a source of electrical supply, a resistance in series with the motor-armature, and a generator mechanically connected to the motor and arranged to control said resistance in starting and stopping the motor.

9. In combination with an alternating-current motor, a source of electrical supply, a resistance electrically connected to the motor, and a generator connected to the motor and arranged to control the movement of the motor upon starting, by controlling the resistance.

10. In combination with a motor, an opposition element in circuit with the motor and a generator mechanically connected to the motor and arranged to control the movement of the motor in starting and stopping by controlling the opposition element.

11. In combination with an alternating-current motor, a resistance electrically connected to the motor, and a generator connected to the motor and arranged to control the resistance in proportion to the speed of the motor on starting.

12. In combination with a motor, controlling-circuits therefor, electromagnetic switches in the controlling-circuits means for generating a variable voltage in proportion to the speed of the motor, said voltage applied to said electromagnetic switches in the controlling-circuits which are arranged to be actuated by the variable voltage.

13. In combination with a motor, an opposition element in circuit with the motor, a generator so connected to the motor that it will generate a voltage in proportion to the speed of the motor, a plurality of electromagnets in connection with the generator and arranged to control the opposition element.

14. The combination with an electric motor, and a mechanism driven thereby, a generator mechanically connected to the driven mechanism, an electroreceptive device connected to said generator, and means electrically connected to the motor and operated by said electroreceptive device for controlling the acceleration of the motor upon starting.

15. In combination with an electric motor, a mechanism driven thereby, an opposition element in the motor-circuit, an electroresponsive device for controlling the opposition element, and a generator connected to the driven mechanism and arranged to actuate the electroresponsive device to cut the opposition element out of the motor-circuit in a number of steps in proportion to the acceleration of the driven mechanism.

16. In combination with an electric motor, a starting device therefor, electric circuits to actuate the starting device, a source of electrical supply, and another source of electrical supply dependent upon the movement of the motor and arranged to coöperate with the first source of supply to hold the starting device during the rotation of the motor.

17. In combination with an electric motor, a starting device therefor, electric circuits to actuate the starting device, a source of electrical supply, and another source of electrical supply dependent upon the movement of the motor and proportional to its speed and arranged to coöperate with the first source of supply to hold the starting device during the rotation of the motor.

18. In combination with an electric motor, an electrically-operated starting device therefor, electric circuits to actuate the starting device, a source of electrical supply, another source of electrical supply dependent upon the speed of the motor and proportional to its speed and arranged to coöperate with the first source of supply to hold the starting device during the rotation of the motor, and a manually-operated switch to control the circuits to the starting device.

19. A starting device for motors comprising an alternating-current motor, a direct-current generator connected to run with the motor, and means actuated by the current from the generator to control the starting and accelerating of the motor.

20. In combination with an alternating-current motor, a source of alternating-current supply, an opposition element in the motor-circuit, a series of electromagnetic responsive devices for removing the opposition element from the motor-circuit, and a source of direct-current supply dependent upon the movement of the motor and proportional to its speed, arranged to actuate the electroresponsive devices one by one as the speed of the motor increases.

21. In combination with an alternating-current motor, a source of alternating-current supply, a starting device for the motor arranged to be actuated by the alternating current, means dependent upon the movement of the motor for generating a direct current, and a magnetic device operated by such direct current to hold the starting device firmly in closed position.

22. In combination with an alternating-current motor, a source of alternating-current supply, a starting device for the motor arranged to be actuated by the alternating current, a direct-current generator dependent upon the movement of the motor arranged to generate a voltage proportional to the speed of the motor, a magnetic device connected to such direct-current generator and arranged to hold the starting device firmly in closed position, an opposition element in the motor-circuit, and a series of electroresponsive devices for removing the opposition element from the motor-circuit, said electroresponsive devices being connected to the direct-current generator and arranged to be actuated one by one as the motor accelerates.

23. In combination with an alternating-current motor, an electrically-operated starting device therefor, and circuits for actuating the starting device comprising an alternating-current circuit and a direct-current circuit.

24. In combination with an alternating-current motor, a starting device therefor, alternating-current and direct-current circuits, said starting device being actuated by a single-phase alternating current and positively held in operative position by a direct current.

25. In combination with an alternating-current motor, a starting device therefor, said starting device being actuated by a single-phase alternating current and positively held in operative position by a direct current, alternating-current and direct-current electrical circuits for the starting device, and a manually-operated switch for controlling the circuits.

26. In combination with an alternating-current motor, a device for starting the motor in one direction, and another device for starting the motor in the other direction, alternating-current and direct-current circuits said starting devices being actuated by a single-phase alternating current and positively held in operative position by a direct current.

27. In combination with an alternating-current motor, a resistance, an electrically-operated reversing-switch, circuits for the reversing-switch for both alternating and direct currents, a manually-operated switch for controlling the circuits, electroresponsive devices for controlling the resistance, and a direct-current generator connected to run with the motor, arranged to supply the direct-current circuits for the reversing-switch and to automatically actuate the electroresponsive devices.

28. In combination with an alternating-current motor, a resistance, an electrically-operated reversing-switch, circuits for the reversing-switch for both alternating and direct currents, a manually-operated switch for controlling the circuits, electroresponsive devices for controlling the resistance, and a direct-current generator connected to run with the motor arranged to supply the direct-current circuits for the reversing-switch and to automatically actuate the electroresponsive devices in proportion to the acceleration of the motor.

29. In combination with an alternating-current motor, a resistance, an electrically-operated reversing-switch, circuits for the reversing-switch for both alternating and direct currents, a manually-operated switch for controlling the circuits, electroresponsive devices for cutting out the resistance step by step, and a direct-current generator connected to run with the motor arranged to supply the direct-current circuits for the reversing-switch and to automatically actuate the electroresponsive devices one at a time in proportion to the acceleration of the motor.

30. In combination with a motor, means for reversing the direction of rotation of the motor, a generator connected to run with the motor, means for keeping the direction of the current generated by the generator the same if the direction of rotation of the motor is changed, and means actuated by the current generated by the generator for controlling the motor.

31. In combination with a motor, means for reversing the direction of rotation of the motor, a resistance for the motor-circuit, a generator connected to run with the motor, means for keeping the direction of the current generated by the generator the same if the direction of rotation of the motor is changed, and means actuated by the current generated by the generator for controlling the motor by cutting the resistance into and out of the motor-circuit.

32. In combination with a motor, means for reversing the direction of rotation of the motor, a generator connected to run with the motor, means connected with the generator for keeping the direction of its generated current the same, said generator arranged to generate a voltage in proportion to the speed of the motor, and electroresponsive devices dependent upon the generated voltage for controlling the acceleration of the motor.

33. In combination with an alternating-current motor, a starting device therefor, and a direct-current generator connected to run with the motor and arranged to control the acceleration of the motor, in starting the motor.

34. In combination with an alternating-current motor, a starting device therefor actuated by alternating current, and a direct-current generator connected to run with the motor and arranged to control the acceleration of the motor.

35. In combination with an alternating-current motor, means for starting the motor in one direction or the other, and a direct-current generator connected to run with the motor and arranged to control the acceleration of the motor.

36. In combination with an alternating-current motor, means for starting the motor in one direction or the other, said means actuated by alternating current, and a direct-current generator connected to run with the motor and arranged to control the acceleration of the motor.

37. In combination with an alternating-current motor, means for starting the motor in one direction or the other, said means actuated by an alternating current, a manually-operated switch for controlling the starting device, and a direct-current generator connected to run with the motor and arranged to control the acceleration of the motor.

38. In combination with an alternating-current motor, a starting device therefor, alternating-current and direct-current circuits, said starting device being actuated by an alternating current and positively held in operative position by a direct current.

39. In combination with an alternating-current motor, a starting device therefor, said starting device being actuated by an alternating current and positively held in operative position by a direct current, alternating-current and direct-current electrical circuits for the starting device, and a manually-operated switch for controlling the circuits.

40. In combination with an alternating-current motor, a device for starting the motor in one direction, and another device for starting the motor in the other direction, alternating-current and direct-current circuits, said starting devices being actuated by an alternating current and positively held in operative position by a direct current.

41. In a starting device for alternating-current motors, a source of supply, a starting mechanism, alternating-current and direct-current circuits, means connected with said source of supply arranged to actuate the starting mechanism to start the motor, and a direct-current generator mechanically connected to the motor and arranged to control the acceleration of the motor step by step.

42. In a system of motor control, two sources of current-supply, one being pulsating and connected to the motor, the other being a direct current generated by the movement of the motor and variable from zero to a maximum in proportion to the speed of the motor and adapted to control the acceleration of the motor.

43. In a system of motor control, two sources of current-supply, one of which is not variable and is connected to the motor, the other of which is generated by the movement of the motor and is variable from zero to a maximum in proportion to the speed of the motor.

44. In a system of motor control, two sources of current-supply, one of which is not variable and is connected to the motor, the other of which comprises a generator connected to the motor and is variable from zero to a maximum in proportion to the speed of the motor.

45. In a system of motor control, two sources of current-supply, one being obtainable before the motor is started and the other being dependent upon the movement of said motor, means operated by current from one of said sources for starting, reversing or stopping the motor, and means operated by current from the other source for effecting an acceleration of the motor.

46. In combination with an electric motor, an external source of current-supply of practically constant value, a controlling device in series with the motor, and a generator mechanically connected to the motor and arranged to control the controlling device.

47. In combination with an electric motor, an external source of current-supply of practically constant value, a starting-switch for the motor, a controlling device for the motor, and a generator mechanically connected to the motor and arranged to control the controlling device.

48. In combination with an electric motor, an external source of current-supply of practically constant value, an electrically-actuated starting-switch for the motor, a manually-operated circuit-closer for the starting-switch, a controlling device for the motor, and a generator mechanically connected to the motor and arranged to control the controlling device.

In witness whereof I have signed my name to this specification in the presence of two subscribing witnesses.

AXEL MAGNUSON.

Witnesses:
 WALTER C. STRANG,
 ERNEST W. MARSHALL.